United States Patent [19]

Ronlan

[11] Patent Number: 4,867,792
[45] Date of Patent: Sep. 19, 1989

[54] TIRE BALANCING COMPOSITION
[75] Inventor: Alvin Ronlan, Fort Lauderdale, Fla.
[73] Assignee: Alber Corporation, Boca Raton, Fla.
[21] Appl. No.: 152,855
[22] Filed: Feb. 5, 1988
[30] Foreign Application Priority Data
  Feb. 5, 1987 [DK] Denmark .................. 600/87
[51] Int. Cl.[4] .................. C08L 1/08; B60B 13/00
[52] U.S. Cl. .................. 106/189; 106/33; 106/162; 106/204; 152/154.1
[58] Field of Search .......... 106/33, 190, 162, 189, 106/204, 170, 204; 252/315.1, 315.3; 152/504, 154.1; 523/166

[56] References Cited
U.S. PATENT DOCUMENTS

| 4,101,494 | 7/1978 | Kent et al. | 152/504 |
| 4,139,395 | 2/1979 | Dunlap | 106/157 |
| 4,701,016 | 10/1987 | Gartside | 252/315.01 |
| 4,713,114 | 12/1987 | Smith | 106/33 |

Primary Examiner—Theodore Morris
Attorney, Agent, or Firm—Birch, Stewart, Kolasch & Birch

[57] ABSTRACT

A thixotropic tire balancing composition having a yield stress value between 30 Pa and 260 Pa, preferably about 120 Pa, is capable of balancing air by being capable of flowing under the influence of the vibrations induced when a heavy spot on the tire contacts the road surface. The composition preferably comprises a mixture of: (1) a liquid di- or trihydric alcohol or a di-, tri-, or tetrameric oligomer thereof, optionally containing water; (2) a polymer soluble or dispersible in the alcohol; (3) hydrophilic fibers; and, optionally, (4) a hydrophilic filler. The alcohol 1) is preferably a diol of the general formula $HO-(CH(R)-CH_2-O)_n-H$ wherein R is hydrogen or $C_{1-2}$ alkyl and n is an integer from 1 to 4.

30 Claims, 4 Drawing Sheets

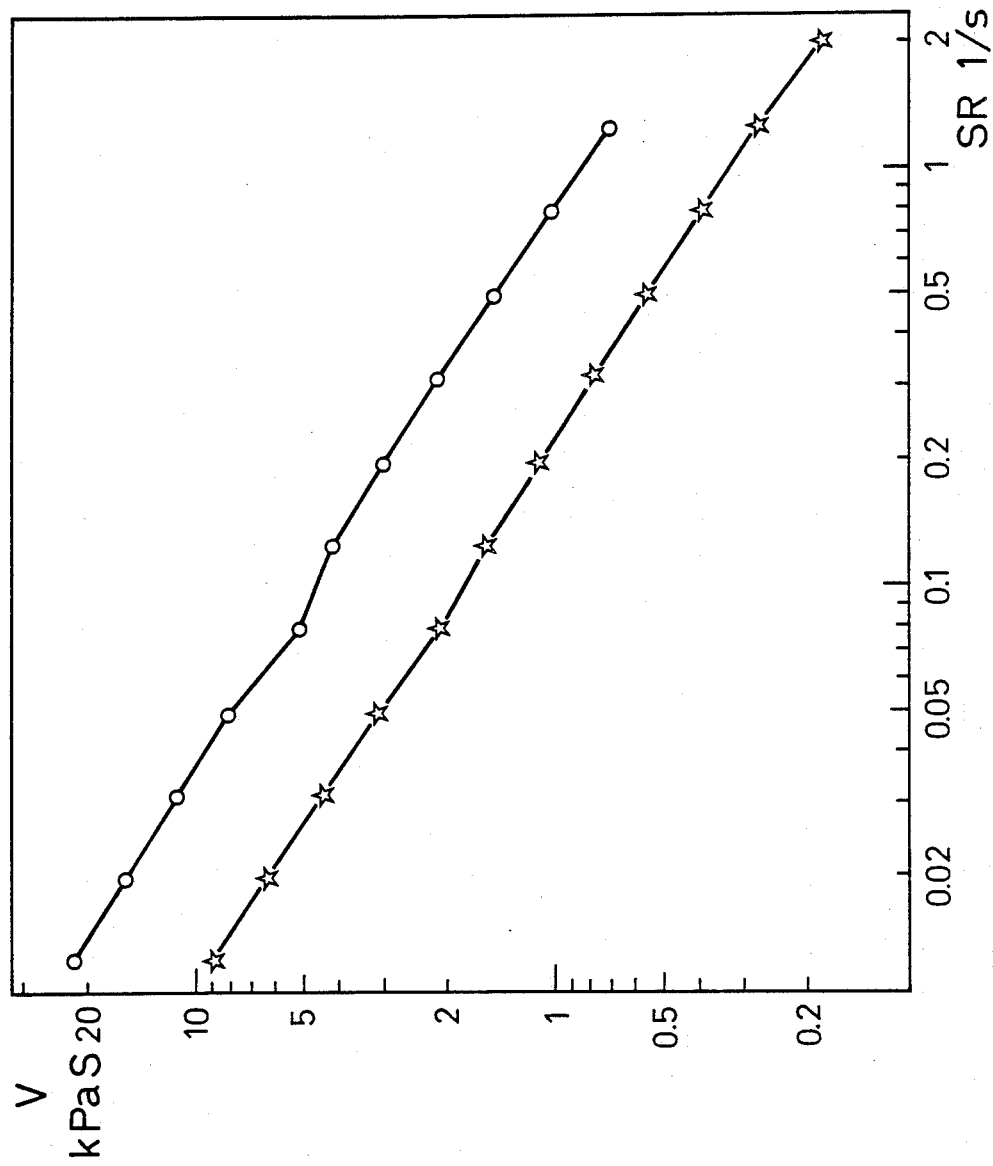

TIRE BALANCING COMPOSITION

FIELD OF THE INVENTION

The present invention relates to non-Newtonian compositions for use in eliminating imbalances in motor vehicle wheel assemblies, a method for the preparation of such compositions as well as the use of such compositions.

BACKGROUND OF THE INVENTION

Imbalance in truck or car wheel assemblies (tire+rim) due to imperfect tires or rims causes vibrations which, apart from the discomfort to the driver and any passengers, can dramatically increase the wear rate of the tire as well as mechanical wear on e.g. bearings, etc. Normally, two types of imbalance are to be distinguished between: static imbalance, caused by uneven weight distribution (also known as "heavy spots") in the rotational plane of the wheel assembly, and dynamic imbalance, caused by uneven weight distribution in relation to the rotational plane of the wheel assembly. These two types of imbalance are schematically illustrated in FIGS. 5 and 6 on the drawing. If static imbalance is present, shock waves (vibrations) will be generated each time the heavy spot contacts the road surface during driving, whereas dynamic imbalance causes a wobbling of the wheel which in turn causes vibrations.

Normally, such imbalances are remedied by fastening lead weights on the wheel rim (cf. FIGS. 5 and 6). However, this balancing technique, being of a fixed nature, is not able to compensate for changes in load, uneven wear of the tires or dirt collection on the rim (both leading to changes in weight distribution) and the like. Therefore, the balancing by means of lead weights should be repeated several times during the lifetime of a tire. However, as it will be evident, such a rebalancing procedure is troublesome and may therefore often be dispensed with. Furthermore, in particular on heavy trucks, twin wheels on non-steering axles are even more difficult to rebalance due to i.a. inaccessibility, and such rebalancing or, indeed, even initial balancing is therefore often dispensed with on such wheels, and only a balancing of wheels with a steering function is carried out. As noted above, the consequent imbalances will in effect lead to shorter effective lifetime of the tire. Therefore, it is obvious that a serious need exists for an improved method and improved means for balancing motor vehicle wheels.

The present invention is based on the discovery that the vibrations caused by imbalance in a wheel assembly can induce motion of a liquid inside the tire away from the vibration source (the above-mentioned heavy spot). However, utilizing this "vibrational pressure" to achieve balancing of a wheel assembly (i.e. the gravitational center is in the intersection between the rotational plane and the axis of rotation) is by no means trivial. If one only introduced a free-flowing liquid such as water into a standard 22" (56 cm) truck tire spinning without loading at a rate corresponding to 90 km/h (i.e. approximately 7 revolutions per second), the liquid would merely distribute itself evenly around the inner rim of the tire due to the centrifugal force (which is in the order of 125×g) in such a way that the surface of the liquid is always at a constant distance from the rotational axis. Since such a distribution is unable to take into account any uneven distribution of weight, this procedure might just as well aggravate as diminish or leave unchanged any existing imbalance. If for example imbalance was introduced on this wheel assembly by attaching a lead weight on the rim, the imbalance would evidently not affect the centrifugal force exerted on the liquid and would therefore not affect the distribution of the liquid. If a load was applied to this wheel assembly by means of spinning it against a metal drum (in order to simulate actual road conditions), strong vibrations would occur each time a heavy spot hit the drum. As mentioned earlier, such vibrations would result in a "vibrational pressure" on the liquid directed away from the heavy spot. In a free-flowing liquid (i.e. having a short relaxation time), however, this movement due to the vibrations would be counteracted by the centrifugal force, and the net result would merely be an oscillating movement of the liquid with no balancing effect whatsoever.

SUMMARY OF THE INVENTION

The model discussed above is in many ways a simplification since it relates to a tire that is unloaded. In actual use, a tire is not round because the part of the tire that is in contact with the road surface is flattened. For example, if one considers a heavy truck with 22" tires it is well known that under load, the distance from the flattened part of the tire in contact with the road surface to the wheel axis is up to about 50 mm shorter than the distance from the diametrically opposite part of the tire to the axis. If a tire is balanced by means of lead weights which, since they are attached to the rigid rim, do not change the location of the center of gravity of the wheel assembly as the wheel rotates, such a tire will be imbalanced when the heavy spot passes over the road surface. In contrast to this—and this is the most fundamental difference between the use of lead weights and the present invention—the balancing composition of the present invention changes it overall shape when the shape of the tire changes. Furthermore, the composition of the invention can assume very complex shapes and also undergo minor changes of shape and distribution during each revolution of the wheel assembly. In short, the polymer-containing composition of the present invention is capable of changing the location of its center of gravity synchronously (and in the opposite direction) with changes in the location of the gravity of the wheel assembly.

In order to provide a solution to the problem outlined above, the present invention has now developed certain non-Newtonian viscous compositions in which the movement caused by the vibrational pressure is only to a certain extent offset by the centrifugal force. The equilibrium distribution is determined by the relationship between the thixotropic properties of the composite, the vibrational pressure (i.e. the amplitude and frequency of the vibrational waves) and the centrifugal force exerted on the composition. By careful tuning of the visco-elastic properties of composite, perfect self-adjusting balance of a tire assembly can be achieved by merely introducing such a composition into the tire. FIGS. 1, 2, 3 and 4 illustrate schematically how the balancing composition functions. Before mounting the tire, the composition is spread evenly around the inner peripheral surface by means of e.g. a spatula. After driving 2-10 km with the vehicle, all vibrations due to imbalance cease, and if the tire is removed, careful observation will show that the film of balancing composition gradually thickens when moving away from the heavy spot and reaches a maximum thickness diametrically (in case of static imbalance) or diagonally (in case of dynamic imbalance) opposite the heavy spot. However, the maximum difference in thickness of the layer of balancing composition is rarely more than approximately 4 mm. As long as no new imbalance occurs (as a result of wear, changes in load, etc.), this established configuration remains stable. However, any new imbalance will cause new vibrations and consequent movement to a new configuration giving perfect balance and so on.

The present invention has established that the most important rheological property of the balancing composition is its so-called yield stress. It has been found that in order to achieve satisfactory balancing properties, the yield stress should not exceed 260 Pa. FIGS. 7 and 8 show curves depicting the viscosity/shear rate and the shear stress/shear rate realtions, respectively, for i.a. a composition having a somewhat too high yield stress for responding to the vibrational pressure. The lower limit for the allowable yield stress for a well-functioning balancing composition has experimentally as well as by calculation (as outlined below) been established to be in the order of 30 Pa. It is preferred that the yield stress is between 40 Pa and 150 Pa, in particular about 120 Pa. A typical shear stress/shear rate curve for a well-functioning balancing composition is shown in FIG. 8.

For calculating the useful yield stress interval, applicants used a standard 22" truck tire with a static imbalance of 300 grams in one single heavy spot, 300 grams being the maximum imbalance encountered in practice. In order for the balancing composite to balance this heavy spot, the sloping layer of balancing composition (cf. FIG. 4) should contain $300 \times \pi^2/4$ grams of mass which works out to be 740 grams. The width of the layer of balancing composition is in the order of 10 cm. Assuming that the thickness of the film increases linearly up to its thickest point opposite the heavy spot, it can be calculated that the film is approximately 3 mm thicker at the point opposite the heavy spot. This difference in thickness causes a stress in the balancing composition determined by the rotation rate of the wheel. At a rotation rate of 9 revolutions per second (corresponding to 114 km/h), the pressure at a depth of 3 mm down in the balancing composition (going from the axis towards the inner surface of the tire) is approximately 6000 Pa ($Nm^{-2}$). In other words, by assuming that a displacement of the balancing composition caused by vibration leads to a difference in thickness of 3 mm between the thickest and thinnest part of the composition layer, there will be a pressure drop of 6000 Pa between these two parts. For a rotating body like a wheel, the general expression for the pressure drop will be:

$$\Delta P = [d \times V^2/(12.96 \times r)] \times (r - r_1)$$

where d is the density of the balancing composition (measured in kg/m$^3$), V is a dimensionless number equal to the speed of the motor vehicle measured in kilometres per hour (km/h), r is the inner radius of the tire, and $r_l$ is the distance from the rotational axis to the "top" layer of the balancing composition. The actual stress exerted on the balancing composition is determined by on the one hand the distance between the thinnest and the thickest parts of the balancing composition layer and on the other hand by the pressure drop (the "slope" of the balancing composition layer). From these theoretical considerations, the maximum stress due to centrifugal force (and the uneven distribution of the composite required in order to achieve balance) induced in the balancing composition can be estimated to be 45 Pa for a 22" tire moving with a translational speed of 114 km/h.

Taking into account the normal speed intervals encountered in trucks, the above-given yield stress intervals can be arrived at as functional values.

DETAILED DESCRIPTION OF THE INVENTION

In order to establish the type of compositions which would satisfy the above-mentioned viscosity criteria, the present inventor has carried out intensive studies involving tests of a wide range of pure polymers, polymer blends, polymer solutions and various solvents, dispersions of various solids (in particle or fiber form) in various solvents and blends of two or more of these compositions that all satisfied the viscosity criteria set up above. When testing such compositions, the balancing properties vary between excellent and acceptable proving that the viscosity criteria are applicable. However, apart from satisfying the purely functional criteria, i.e. the ability to cancel out imbalances in a wheel, it is first of all preferable that the material should preserve its balancing properties during the entire lifetime of a tire, usually 1-3 years. Secondly, the material should preferably function in the temperature interval encountered in actual use in tire, i.e. the lower limit being the lowest temperatures normally encountered when starting up a vehicle, namely ca. $-30°$ C., and the upper limit being the maximum operating temperature of tire when driving, namely about $+90°$ C.

In order to satisfy these criteria, the present inventor has established that a non-Newtonian (generally thixotropic) composition comprising a mixture of: (1) a liquid di- or trihydric alkohol or a di-, tri-, or tetrameric ether-type oligomer thereof, optionally containing water; (2) a polymer dispersible or, preferably, soluble in the alcohol (1); and (3) hydrophilic fibers can be manufactured to satisfy all the above requirements for a wellfunctioning self-balancing composition for use in truck or car tires. The alcohol (1) may contain up to 10 or 20% by weight of water. The alcohol (1) is preferably a diol of the general formula HO-(CH(R)-CH$_2$-O)$_n$-H, wherein R is hydrogen or C$_{1-2}$ alkyl and n is an integer from 1 to 4. In order to reduce the chances of corrosion, it is preferred that the composition has a pH value in the range from 5 to 9, in particular 6-7.

In a preferred embodiment, the balancing composition further contains: (4) a hydrophilic filler that is insoluble in water as well as in the alcohol (1) defined above.

For the purposes of the present invention, the term "hydrophilic" as applied to the fiber component (3) and the filler (4) is intended to mean that the material in question has a contact angle $\theta$ against water of less than 70° at 20° C., in particular between 20° and 40°, the contact angle generally being measured on a smooth surface of the material. As far as the fiber component (3) is concerned, such contact angle properties may be obtained if the fiber material has polar N- or O-containing groups in its molecule, e.g. amino, carbonyl, hydroxy, carboxy, sulphoxy, or similar groups. The terms "soluble" and "dispersible" as used about the polymer are intended to mean that the polymer is soluble or dispersible in the alcohol component (1) (and preferably also in water) in an amount of up to 30% by weight, in particular up to 40% by weight.

Due to their potential cross-linking properties with the alcohol component (1), a particularly interesting class of polymers are those which contain free carboxy groups in the molecule. By employing such polymers, it will be possible to establish cross-linking bonds between the polymer and the alcohol (1) in the already finished composition or at some stage during the manufacture of the composition, and such cross-linking will give good possibilities of carrying out "fine-tuning" of the thixotropic properties of the composition.

Examples of the polymer that may be useful are: $C_{1-3}$ alkyl cellulose such as methyl cellulose; hydroxy-$C_{1-3}$-alkyl cellulose such as hydroxyethyl or hydroxypropyl cellulose; carboxymethyl cellulose; carrageenan; guar gum; gum agar; gum arabic; gum ghatti; gum karaya; gum tragacanth; locust bean gum; tamarind gum; xanthan gum; pectins; polyacryl amide; polymers of an acid of the general formula $R_1HC=C(R_2)COOH$ wherein $R_1$ and $R_2$ each independently are hydrogen, $C_{1-2}$ alkyl, hydroxy-$C_{1-4}$ alkyl or carboxy-$C_{1-4}$ alkyl (e.g. polyacrylic acid or polymethacrylic acid); polyethylene glycol; polypropylene glycol; polyethylene oxide; polyvinyl alcohol; polyvinyl-pyrrolidone; starch and modified starch (e.g. $C_{1-3}$ alkyl starch, such as methyl starch; hydroxy-$C_{1-3}$ alkyl starch, such as hydroxyethyl; or hydroxypropyl starch; or carboxymethyl starch); as well as mixtures thereof. The polymer may be employed as an aqueous emulsion with a polymer content of up to 30 to 40% by weight. Thereby, the aqueous phase may contribute to the water content of the alcohol component (1) above.

As mentioned above, particularly preferred polymers among the examples given above are those that contain carboxy groups, e.g. polyacrylic acid, polymethacrylic acid, carboxymethyl cellulose, alginates, etc.

The general formula of the diol given above is preferred since it has been found that diols, in which the oxygen-carrying carbons in the subunits are in neighboring positions, give the best performance. Examples of diols with the general formula given above are ethylene glycol, diethylene glycol, triethylene glycol, propylene glycol, dipropylene glycol and tripropylene glycol as well as mixtures thereof.

With respect to the fiber component of the composition, a wide variety of synthetic and natural fibers exhibit the hydrophilic properties necessary for incorporation into a composition of the invention. A list of examples which is neither exhaustive nor limiting may comprise mineral (e.g. rockwool or asbestos), glass, polyacrylic, polyester, nylon, viscose, cotton, wool, cellulose, silk, and hemp fibers as well as mixtures thereof. In order for the fibers to contribute to the thixotropic properties of the composition of the invention, the fibers should not be too long, a preferred range of length being 0.5-6 mm, and a preferred thickness range being 1-25 μm.

As mentioned above, it is of particular interest if the alcohol and polymer components are able to cross-link with one another. Consequently, it is also preferred in the fiber component is able to at least partly take part in this cross-linking which would further serve to establish the non-Newtonian properties of the composition of the present invention. Cross-linking of the fiber component will be possible if the fiber molecules contain reactive hydroxy groups, and for i.a. this reason, preferred types of fibers are those based on polysaccharides e.g. viscose, cotton, cellulose, and hemp fibers.

The function of the hydrophilic filler component (4) mentioned above is partly to give the possibility of controlling the density of the composition of the present invention and partly to serve as an "anchoring" material for the other components in the composition. A preferred type of filler is a metal oxide, metal carbonate, metal hydroxide or metal silicate that is insoluble in the alcohol (1) defined above and in the composition as well as in water since the composition may contain water or since minor amounts of condensation water may get in contact with the composition when placed inside a tire. Examples of useful fillers are $CaCO_3$, $BaCO_3$, $MgO$, $Fe_3O_4$, kaolin, $TiO_2$ as well as mixtures thereof. In order to prevent the filler from precipitating at the "bottom" of the layer of the composition according to the invention, i.e. precipitating on the inside surface of the tire as a result of centrifugal forces, the filler should preferably have a particle size in the range 5-25 μm, such as in the range 10-15 μm.

If the polymer or, indeed, the fiber material is pH-active (i.e. contains acid or alkaline groups), the composition of the present invention may well further contain a pH-buffering agent. Since a preferred type of polymer, as mentioned above, contains free carboxy groups, such a pH-buffering agent is preferably alkaline such as a soluble hydroxide or an amine or an amine derivative. Useful examples of such pH-buffering agents are $NaOH$, $NH_4OH$, triethanol amine, and diethanol amine or mixtures thereof.

A composition according to the present invention may contain 30-90% by weight of the alcohol (1), 3-40% by weight of the polymer (2), 0.5-6% by weight of the hydrophilic fibers (3), 0-20% by weight of the filler (4), and 0-10% by weight of the pH-buffering agent; preferably 50-80% by weight of the alcohol (1), 5-20% by weight of the polymer (2), 2-5% by weight of the fibers (3), 5-15% such as 10% by weight of the filler (4), and 0-10% by weight of the pH-buffering agent.

The present invention further concerns a method for preparing the non-Newtonian tire balancing composition of the present invention comprising (a) dispersing the fiber component in the alcohol component;

(b) adding the polymer component;

(c) stirring until a homogeneous mixture is obtained; and optionally (d) dispersing the filler component in the obtained mixture.

It is preferred that the fibers after dispersion in the alcohol are left to soak in the alcohol for up to 6 hours, especially up to 4 hours. For dissolving the polymer in the fiber dispersion, the dispersion is preferably brought to a temperature between 20 and 80° C. The final mixing (after adding any filler) is usually carried out over a period of up to 1 hour such as 10-20 minutes. The entire process may conveniently be carried out in the same apparatus such as a conventional mixer.

In a preferred embodiment, the method of the present invention incorporates a step in which cross-linking between on the one hand the polymer (when containing free carboxy groups) and on the other hand the alcohol and optionally the fiber component (when containing free hydroxy groups) is established. The cross-linking may be brought about by, after step (c) but before step (d), inserting a further step (c1) in which a catalyst capable of catalyzing a reaction between the various groups is added. Since the cross-linking mostly consists of the formation of ester bonds, the catalyst is preferably an acid, in particular a strong acid such as a mineral acid, e.g. hydrochloric or sulphuric acid, or an organic acid such as methanesulphonic acid, ethanesulphonic acid, trifluoromethanesulphonic acid, trifluoroacetic acid, trichloroacetic acid, or p-toluenesulphonic acid, especially methanesulphonic acid. The acid may be added in an amount of up to 0.5 parts, preferably up to 0.2 parts per 100 parts of the polymer. After addition of the catalyst, the mixture is reacted for a period of up to 45 minutes, preferably up to 30 minutes (or until the viscosity properties of the mixture are approaching what is desired) followed by step (d), if appropriate. Thereafter, the catalyst is rendered inactive; in the case of the catalyst being an acid, the inactivation of the catalyst is carried out by neutralization of the acid with a base such as those mentioned above as pH-buffering agents. It is preferred that the catalyzed reaction step, and in particular the entire process in this embodiment, is carried out at room temperature (20–21° C.) since the cross-linking reaction is then easier to control, and the gel-like composition is difficult to warm or cool uniformly. As described above, the entire cross-linking process makes it possible to "fine-tune" the viscosity properties of the composition since the cross-linking reaction can be terminated at will, when the desired properties have been reached.

The present invention further provides a method for balancing a motor vehicle wheel assembly comprising applying to the inner surface of the tire of the assembly a non-Newtonian balancing composition as described above, mounting the wheel assembly on a motor vehicle, and driving the vehicle for a distance sufficient to allow the balancing composition to balance the wheel assembly. The composition may be applied in a layer with a thickness of up to 6 mm. Thus, in a standard 22" truck tire, a suitable amount of balancing composition is in the order of 800 grams.

BRIEF DESCRIPTION OF THE DRAWINGS

The present invention will now be further described with reference to the drawings, in which FIGS. 7 and 8 are plots illustrating physical properties of tire balancing compositions according to the present invention.

On the drawings, the reference numeral 10 designates a wheel assembly in its entirety comprising a wheel rim 12 having a rotational axis 14, on which rim 12 a tire 16 is mounted. Most often, the entire wheel assembly comprises a so-called heavy spot 18. In accordance with the conventional technique, as illustrated in FIGS. 5 and 6, the heavy spot 18 is balanced by means of lead weights 20 attached to the periphery of the rim 12.

In FIGS. 1, 2, 3 and 4 it is illustrated how a tire balancing composition 22 of the present invention is introduced in the tire of a wheel assembly in order to compensate imbalance. In the case of static imbalance illustrated in FIG. 1, the polymer composition 22 has, in the part of the tire diametrically opposite the heavy spot 18, been distributed in a sicle-shaped layer that is symmetrical with respect to the central rotational plane. In the case of dynamic imbalance illustrated in FIG. 2, the sicle-shaped layer of balancing composition is situated asymmetrically with respect to the central rotational plane and has its maximum thickness at a point on the opposite side of the rotational plane compared to the heavy spot.

FIG. 3 and 4 are vertical cross-sectional views of a wheel assembly in the central rotational plane, that is, perpendicular to the cross-sectional views of FIGS. 1 and 2. FIG. 3 illustrates how the composition is distributed in a wheel with no imbalance whereas FIG. 4 illustrates how the composition distributes itself in a wheel with imbalance. In the wheel with no imbalance, the balancing composition is distributed in an even layer on the inner tire surface, whereas the balancing composition in the wheel with imbalance is distributed in a layer having its minimum thickness at the point of the heavy spot and having its maximum thickness opposite the heavy spot.

FIG. 7 shows a plot of the logarithm of the viscosity V (in kPa×s) versus the logarithm of the shear rate SR (in $s^{-1}$) for a well-functioning composition (*) and a marginally functioning composition (o). The measurements were carried out on a computerized Bohlin VOR Rheometer System (from Bohlin Rheologi AB, Lund, Sweden). The lefthand end points of the plot curves correspond to the limiting viscosities (9 kPas for the (*)-curve and 22 kPas for the (o)-curve).

FIG. 8 shows a plot of the logarithm of the shear stress SS (in kPa) versus the shear rate SR (in $s^{-1}$) for a well-functioning composition (*) and a composition with a marginally functioning composition with a somewhat too high yield stress value (o). The lefthand end points of the plot curves correspond to the yield stress values (120 Pa for the (*)-curve and 260 Pa for the (o)-curve), i.e. the shear stress at which the composition undergoes a thixotropic transformation and changes from the solid state to the liquid state.

Figure 1:
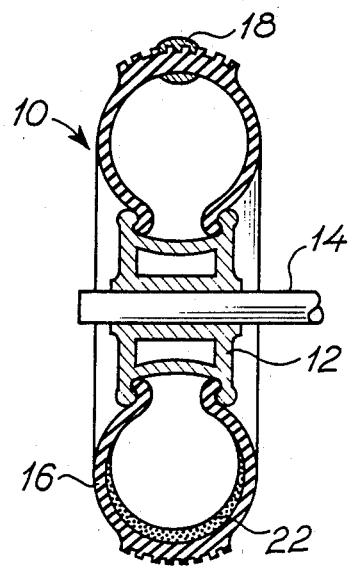
FIGS. 1 and 2 are schematical, vertical sectional views of wheel assemblies having imbalance compensation according to the teaching of the present invention.
Figure 2:
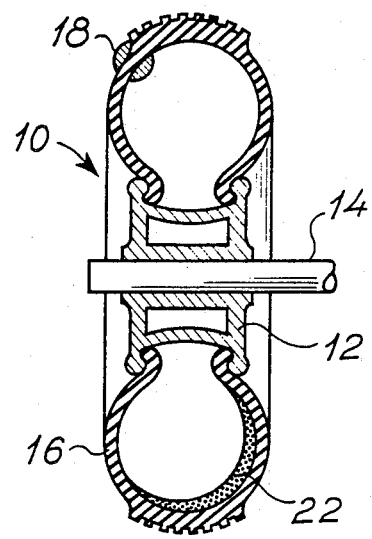

The present invention is further illustrated by the following examples which, however, are not construed to be limiting.

TEST PROCEDURE

General functional balancing test 800 g of composition are applied as an even layer along the inner central perimeter of a 22" truck tire which is then fitted on a rim and mounted on the front axle of a truck, the other front wheel being balanced in the conventional manner by means of lead weights. The pressure in the tire is adjusted to 8 kPa, and the axle loading is 4 tons. The truck is driven at 90 km/h until no further vibrations could be sensed at the steering wheel (driving distance 2-10 km). Thereafter, a lead weight of 300 g is attached to the rim of the wheel fitted with the balancing composition, and the truck is again driven at 90 km/h. Initially, very strong vibrations arose from the front wheel due to the artificially created imbalance. However, if the balancing composition functions well, these vibrations cease after a driving distance of 2-10 km indicating that the balancing composition has moved to compensate for the imbalance. Thereafter, the lead weight is removed, and the truck is again driven at 90 km/h. The initial strong vibrations that arose from the front wheels again disappeared after 2-10 km of driving if the balancing composition functions well. The performance of the balancing composition is rated on a scale from 0 to 5 where 0 indicates no effect on vibrations and 5 indicates complete removal of vibrations. Thus, a rating of 3 equals a passable composition (70-80% balancing), a rating of 4 equals a satisfactory composition (81-90% balancing), and a rating of 5 equals an excellent composition (91-100% balancing).

General durability test

The ability of the balancing composition to function during the entire lifetime of tire is tested by performing the functional test described above once a month during the entire lifetime of tires on trucks in actual use which has been fitted with the balancing composition.

Effect on tire wear

In this test, the effect of the balancing composition on tire wear is investigated. One front wheel of a truck in actual use is balanced with the test composition, and the other front wheel is balanced with lead weight. Once a month the wheels are switched to ensure similar wear conditions for both front wheels. The wear of the tires is judged by measuring the depth of the tire pattern with a micrometer and expressing the reduction of the tire pattern thickness in mm.

Specific examples of composition components other than those used in the examples below are:

(1) As fiber component: polyacrylonitrile fibers, length 6 mm, thickness 18 $\mu$m, and (2) as polymer component: The cellulose ethers Methocel MC, Methocel HG, and Methocel HB from Dow Chemical Corp.; the Polyox polyethylene oxide homopolymers from Union Carbide Corp.; the Rhodopol xanthane gums from Rhone-Poulenc, France; and the Cekol carboxymethyl celluloses, e.g. Cekol UVG, from Uddeholm AB, Sweden.

General procedure for preparing cross-linked balancing compositions (Example 1-4)

The entire process is carried out at room temperature (20°-21° C.). The fiber component is dispersed in the alcohol while stirring and left to soak for 4 hours. The polymer is then added, and the mixture is stirred in a so-called "paint dissolver" (from Spangberg, West Germany) until a homogeneous mixture is obtained (15-60 minutes mixing time). Thereafter, 0.2 parts of methanesulphonic acid per 100 parts of polymer are added and the mixture is stirred for another 30 minutes, then the filler is added and mixing is continued until the filler is evenly dispersed (10-20 minutes). Finally, neutralization base in an amount corresponding to 100% neutralization of the carboxylic groups of the polymer is added, and the mixture is stirred in the dissolver until complete neutralization has occurred, i.e. until the pH of the mixture has stabilized (15-60 minutes).

EXAMPLE 1

Figure 8:
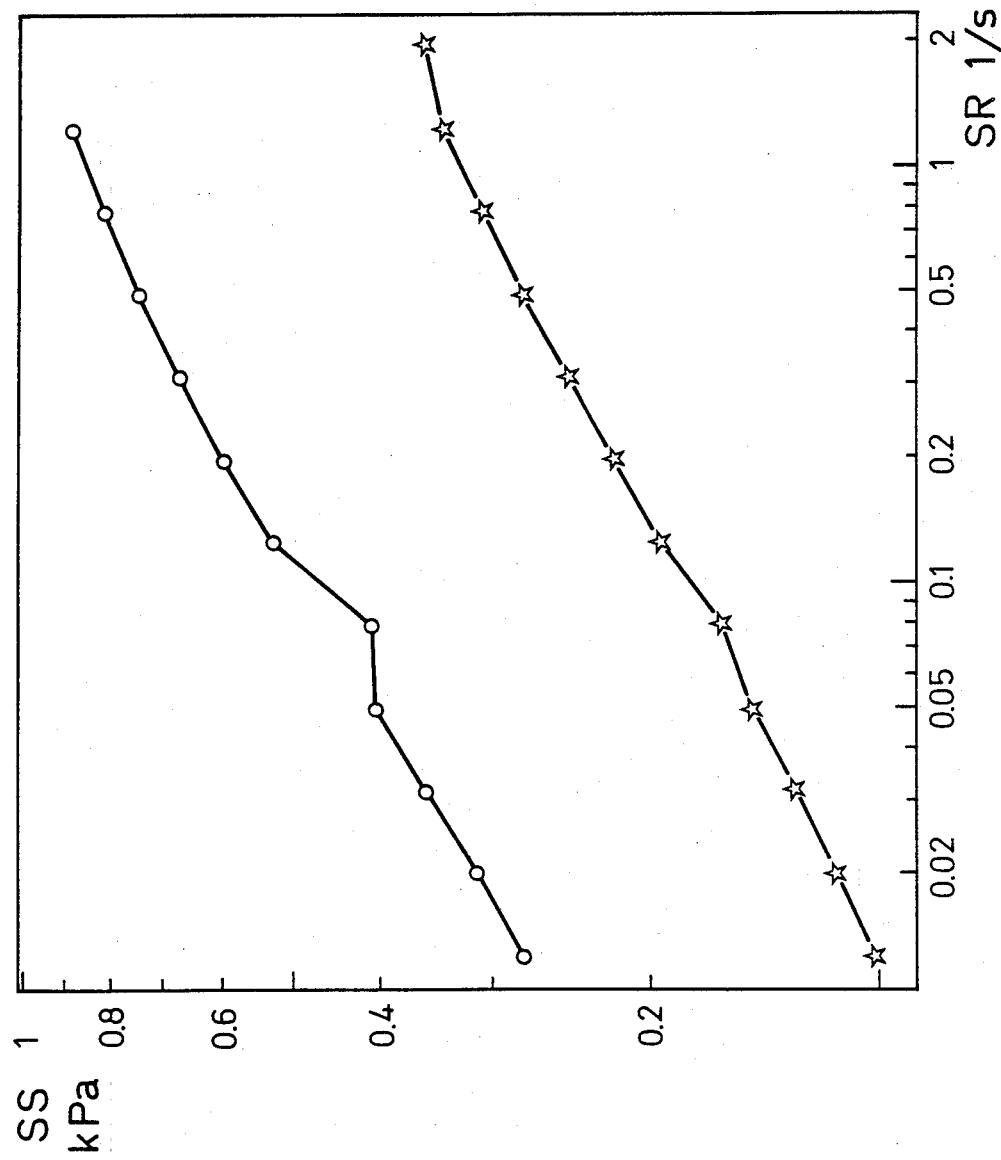

72 kg diethylene glycol, 3 kg glass fiber (fibers from C-glass, length 2-5 mm, diameter ca. 6 $\mu$m and with a strong positive surface charge; Wollmix 2100 from Gedevelop AB, Sweden), 3 kg acrylic acid polymer (Carbopol 934 from B. F. Goodrich), 6 g methanesulphonic acid, 10 kg precipitated barium carbonate (particle size 5-15 $\mu$m) and 12 kg 10% sodium hydroxide solution in water are mixed according to the general procedure above. The yield stress of this composition is 210 Pa, and the limiting viscosity is 17 kPas (measured as in FIG. 8 and 7). The rating in the functional balancing test is 4. This rating remained constant in a 13 month long durability test covering a total of 87,000 km. In the wear test conducted in parallel with the durability test, the tires balanced with this composition showed 9% less wear than the conventionally balanced wheel (7.1 mm wear vs. 7.8 mm wear). Furthermore, the wear of the tire fitted with the balancing composition is very even and gave a smooth surface which could easily be retreaded. In general, it is found that easy retreading is a general property resulting from a well functioning balancing composition. In contrast, tires balanced with lead weights invariably are unevenly worn and consequently much more difficult to retread.

EXAMPLE 2

Figure 5:
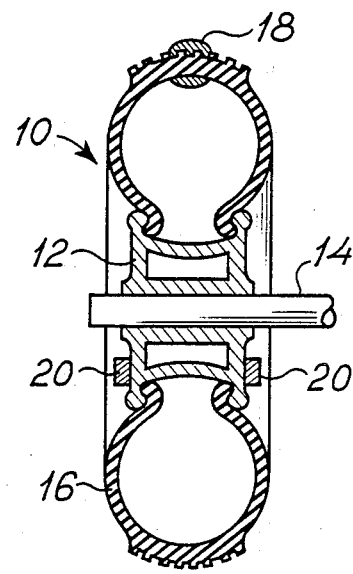
FIG. 5 illustrates the case of so-called static imbalance where the heavy spot 18 is in the central rotational plane of the wheel assembly and where balance has been attained by attaching lead weights 20 of equal mass on the two rim edges opposite the heavy spot 18. In the case of so-called dynamic imbalance as illustrated in FIG. 6 where the heavy spot 18 is situated outside the central rotational plane, a single lead weight 20 has been attached to the rim edge on the opposite side of the rotational plane relative to the heavy spot 18 and in a position opposite the heavy spot.
Figure 6:
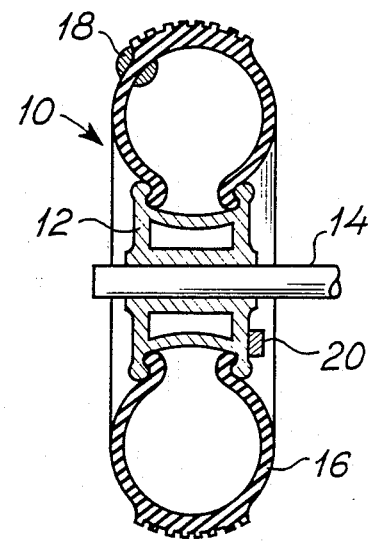
Figure 3:
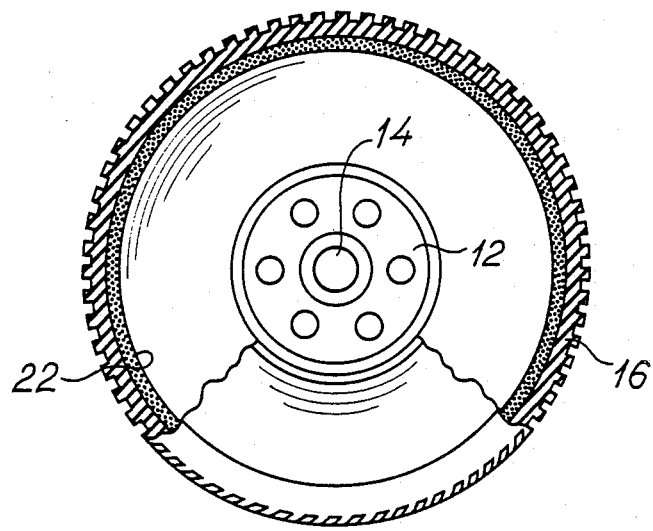
FIGS. 3 and 4 are schematical, vertical sectional views of wheel assemblies having imbalance compensation according to the teaching of the present invention, the section plane being perpendicular to those of the views in FIGS. 1 and 2, FIGS. 5 and 6 are schematical, vertical sectional views, corresponding to FIGS. 1 and 2, of wheel assemblies having conventional imbalance compensation by means of attached lead weights.
Figure 4:
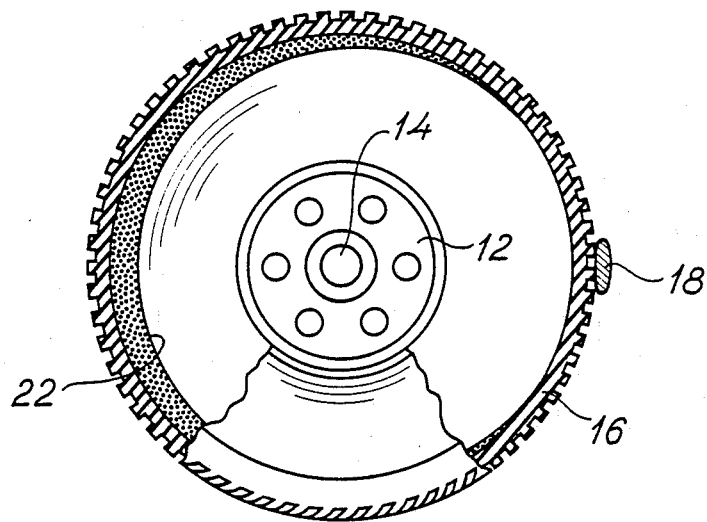

61.7 kg ethylene glycol, 3 kg cellulose fibers (from spruce, having an average diameter of 3 m and a length of 2.1-2.4 mm), 18.3 kg polyacrylic acid emulsion (Acrysol ASE-60, a 28% polyacrylic acid emulsion in water, from Rohm & Haas Company, Philadelphia), 37 g methanesulphonic acid, 10 kg precipitated calcium carbonate (particle size 5-15 $\mu$m) and 8.2 kg of a 8% sodium hydroxide solution in water are mixed as described above. The yield stress of the composition is 120 Pa, and the limiting viscosity is 9 kPas (measured as in FIG. 5 and 4). The rating in the functional balancing test is 5. The rating remained constant during a 12 month long durability test covering 93,000 km. In the wear test conducted in parallel with the durability test, the tires balanced with the composition showed 12% less wear than the conventionally balanced tires (6.7 mm wear vs 7.6 mm wear).

EXAMPLE 3

84 kg monopropylene glycol, 1.5 kg cotton fiber (Egyptian raw cotton cut to 3 mm average length), 15 kg polyacrylic acid emulsion (Acrysol ASE-75, 28% emulsion in water from Rohm & Haas Company, Philadelphia), 30 g methanesulphonic acid, 15 kg kaolin (particle size 15-20 $\mu$m) and 2.5 kg triethanol amine are mixed as described above. The yield stress of the composition is 80 Pa, and the limiting viscosity was 6 kPas. The rating in the functional balancing test is 4.

EXAMPLE 4

84 kg monopropylene glycol, 1.5 kg cotton fiber (Egyptian cotton cut to 3 mm average length), 17 kg polyacrylic acid emulsion (Acrysol ASE-95, 28% emulsion in water from Rohm & Haas, Philadelphia), 30 g methane sulphonic acid, 11 kg magnetite (average particle size 5 $\mu$m, approximate formula $Fe_3O_4$), and 9.6 kg 10% ammonia solution in water are mixed as described above. The resulting composition had a yield stress of 130 Pa, and a limiting viscosity of 10 kPas (measured by the method in FIGS. 8 and 7). The rating in the functional balancing test is 5.

General procedure for preparing a non-cross-linked balancing composition (Example 5-7)

The fiber component is dispersed by stirring in the alcohol component containing 8-20% water and left to soak for 4 hours. The dispersion is then heated to a temperature suitable for dissolving the polymer (between 20° and 80° C.), and the polymer is added and the mixture stirred in a "paint dissolver" until a homogeneous mixture is obtained (0.5-4 hours mixing time). The filler is then added and mixing is continued until the filler is evenly dispersed (10-20 minutes mixing time).

EXAMPLE 5

370 kg ethylene glycol containing 8% water and 0.8% sodium chloride, 20 kg cellulose fiber (same type used as in Example 2) 30 kg xanthane gum (Rhodopol 23, from Rhone-Poulenc, France), and 60 kg kaolin (particle size 15-20 μm) are mixed as described above. The mixing temperature is 40° C., and the time required to dissolve the polymer is 4 hours. The yield stress value is 98 Pa. The rating of this composite in the functional balancing test is 5, a rating that remained constant during a 12 month long durability test. In a parallel wear test, a 12% reduction of tire observed compared to a tire balanced by means of lead weights.

EXAMPLE 6

85 kg monopropylene glycol containing 18% water, 2 kg cellulose fiber (of the type used in Example 2 above), 3 kg polyoxyethylene homopolymer (Polyox WSR-301, from Union Carbide Corporation), and 10 kg precipitated calcium carbonate (particle size 5-15 μm) is mixed as described above. The mixing temperature is 21° C., and the time required to dissolve the polymer is 3.5 hours. The yield stress of the composition is 195 Pa, and the limiting viscosity is 11 kPas (method as in FIGS. 7 and 8). The rating of this composite in the functional balancing test is 5.

EXAMPLE 7

85 kg diethylene glycol containing 8% water, 3 kg cellulose fiber (of the type used in Example 2), 4 kg hydroxypropyl methyl cellulose (Methocel 60HG from Dow Chemical Co.) and 10 kg kaolin (particle size 15-20 μm) are mixed as described above. The mixing temperature is 90° C., and the time required to dissolve the polymer is 2. hours. The yield stress of the composition is 185 Pa, and the limiting viscosity is 10 kPas (measured as in FIG. 7 and 8). The rating in the functional balancing test is 5.

I claim:

1. A thixotropic tire balancing composition having a yield stress value between 30 Pa and 260 Pa at temperatures between −30° C. and +90° C. comprising the following components:
   (1) a liquid di- or trihydric alcohol, a di-, tri- or tetrameric oligomer of said alcohol or a mixture of water and said alcohol or said oligomer;
   (2) a polymer which is soluble or dispersible in component (1) selected from the group consisting of $C_{1-3}$ alkyl cellulose, hydroxy-$C_{1-3}$ alkyl cellulose, carboxymethyl cellulose, a polymer of an acid of the general formula $R_1HC=C(R_2)COOH$ wherein $R_1$ and $R_2$ are independently hydrogen, $C_{1-2}$ alkyl, hydroxy-$C_{1-4}$ alkyl or carboxy-$C_{1-4}$ alkyl and mixtures thereof; and
   (3) a hydrophilic fiber selected from the group consisting of viscose, cotton, wool, cellulose, silk, a hemp fiber and mixtures thereof.

2. The composition as claimed in claim 1 in which the yield stress value is between 40 Pa and 150 Pa.

3. The composition as claimed in claim 2 in which the yield stress value is about 120 Pa.

4. The composition as claimed in claim 11, in which component (1) is a liquid alcohol, wherein the alcohol is a diol of the general formula HO-(CH(R)-CH$_2$-O)$_n$-H, wherein R is hydrogen or $C_{1-2}$ alkyl and n is an integer from 1 to 4.

5. The composition as claimed in claim 1 having a pH value in the range of from 5 to 9.

6. The composition as claimed in claim 11, which further comprises component (4), wherein component (4) is a hydrophilic filler which is insoluble in water and component (1).

7. The composition as claimed in claim 5, wherein the pH is in the range of from 6 to 7.

8. The composition as claimed in claim 4 in which the diol is selected from the group consisting of ethylene glycol, diethylene glycol, triethylene glycol, propylene glycol, dipropylene glycol tripropylene glycol and mixtures thereof.

9. The composition as claimed in claim 1 in which the hydrophilic fibers have a length in the range 0.5-6 mm and a thickness in the range 1-25 μm.

10. The composition as claimed in claim 6 in which the hydrophilic filler of component (4) is a metal oxide, carbonate, hydroxide, or silicate.

11. The composition as claimed in claim 10 in which the hydrophilic filler is selected from the group consisting of $CaCO_3$, $BaCO_3$, MgO, $Fe_3O_4$, kaolin, $TiO_2$ and mixtures thereof.

12. The composition as claimed in claim 10 or 11 in which the hydrophilic filler has a particle size in the range of 5.25 μm.

13. The composition as claimed in claim 12, wherein the particle size is in the range of 10-15 μm.

14. The composition as claimed in claim 5 which further component (5), wherein component (5) is a pH-buffering agent.

15. The composition as claimed in claim 14 in which the buffering agent of component (5) is a soluble hydroxide, an amine or an amine derivative.

16. The composition as claimed in claim 15 in which the buffering agent is selected from the group consisting of NaOH, $NH_4OH$, triethanol amine, diethanol amine and mixtures thereof.

17. The composition as claimed in claim 14 comprising 30-90% by weight of the alcohol of component (1), 3-40% by weight of the polymer of component (2), 0.5-6% by weight of component (3), 0-20% by weight of the filler of component (4) as defined in claim 7, and 0-10% by weight of the pH-buffering agent of component (5) as defined in claim 15.

18. The composition as claimed in claim 17 comprising 50-80% by weight of the alcohol, 5-20% by weight of the polymer, 2-5% by weight of the hydrophilic fibers, 5-15%, of the filler, and 0-10% by weight of the pH-buffering agent.

19. A method for preparing a thixotropic tire balancing composition having a yield stress value between 30 Pa and 260 Pa at temperatures between −30° C. and +90° C. comprising a reaction product produced by reacting a reaction mixture, which comprises forming a reaction mixture comprising:
(1) a liquid di- or trihydric alcohol, a di-, tri- or tetrameric oligomer of said alcohol or a mixture of water and said alcohol or said oligomer;
(2) a polymer containing free carboxy groups and which is soluble or dispersible in component (1) selected from the group consisting of carboxymethyl cellulose, a polymer of an acid of the general formula $R_1HC=C(R_2)COOH$ wherein $R_1$ and $R_2$ are independently hydrogen, $C_{1-2}$ alkyl, hydroxy-$C_{1-4}$ alkyl or carboxy-$C_{1-4}$ alkyl and mixtures thereof; and
(3) a hydrophilic fiber optionally containing free hydroxy groups selected from the group consisting of viscose, cotton, a cellulose fiber and mixtures thereof, said method comprising the following steps:
(a) dispersing the hydrophilic fiber of component (3) in component (1);
(b) adding the polymer of component (2);
(c) stirring until a homogenous mixture is obtained forming the reaction mixture, adding a crosslinking catalyst to the reaction mixture and subjecting said reaction mixture to a crosslinking reaction;
(d) optionally dispersing component (4), wherein component (4) is a hydrophilic filler which is insoluble in water and component (1), in the resulting product of the crosslinking reaction of step (c); and optionally
(e) inactivating the crosslinking catalyst.

20. The method as claimed in claim 19 in which the crosslinking catalyst is an acid, and the inactivation of the catalyst is carried out by neutralizing the acid with a base.

21. A method for balancing a motor vehicle assembly comprising a tire, which comprises:
applying a tire thixotropic balancing composition as defined in claim 1 to the inner surface of the tire, mounting the wheel assembly on a motor vehicle, and driving the vehicle for a distance sufficient to allow the composition to balance the wheel assembly.

22. The method as claimed in claim 21 in which the balancing composition is applied in a layer having a thickness of up to 6 mm.

23. The composition as in claim 11 in which the polymer of component (2) is selected from the group consisting of methyl cellulose, hydroxyethyl cellulose, hydroxypropyl cellulose and mixtures thereof.

24. A method for preparing a thixotropic tire balancing composition having a yield stress value between 30 Pa and 260 Pa at temperatures between $-30°$ C. and $+90°$ C. comprising the following components:
(1) a liquid di- or trihydric alcohol, a di-, tri- or tetrameric oligomer of said alcohol or a mixture of water and said alcohol or said oligomer;
(2) a polymer which is soluble or dispersible in component (1) selected from the group consisting of $C_{1-3}$ alkyl cellulose, hydroxy-$C_{1-3}$ alkyl cellulose, carboxymethyl cellulose, a polymer of an acid of the general formula $R_1HC=C(R_2)COOH$ wherein $R_1$ and $R_2$ are independently hydrogen, $C_{1-2}$ alkyl, hydroxy-$C_{1-4}$ alkyl or carboxy-$C_{1-4}$ alkyl and mixtures thereof; and
(3) a hydrophilic fiber selected from the group consisting of viscose, cotton, wool, cellulose, silk, a hemp fiber and mixtures thereof; and optionally
(4) a hydrophilic filler which is insoluble in water and component (1), said method comprising the following steps:
(a) dispersing the hydrophilic fiber of component (3) in component (1);
(b) adding the polymer of component (2);
(c) stirring until a homogenous mixture is obtained; and optionally
(d) dispersing the hydrophilic filler of component (4) in said mixture.

25. The thixotropic tire balancing composition produced by the method of claim 19.

26. A method for balancing a motor vehicle assembly comprising a tire, which comprises:
applying a tire thixotropic balancing composition as defined in claim 19 to the inner surface of the tire, mounting the wheel assembly on a motor vehicle, and driving the vehicle for a distance sufficient to allow the composition to balance the wheel assembly.

27. The method as claimed in claim 26 in which the balancing composition is applied in a layer having a thickness of up to 6 mm.

28. A thixotropic tire balancing composition having a yield stress value between 30 pa and 260 Pa at temperatures between $-30°$ C. and $+90°$ C. consisting essentially of the following components:
(1) a liquid di or trihydric alcohol, a di-, tri- or tetrameric oligomer of said alcohol or a mixture of water and said alcohol or said oligomer;
(2) a polymer which is soluble or dispersible in component (1) selected from the group consisting of $C_{1-3}$ alkyl cellulose, hydroxy-$C_{1-3}$ alkyl cellulose, carboxymethyl cellulose, a polymer of an acid of the general formula $R_1HC=C(R_2)COOH$ wherein $R_1$ and $R_2$ are independently hydrogen, $C_{1-2}$ alkyl, hydroxy-$C_{1-4}$ alkyl or carboxy-$C_{1-4}$ alkyl and mixtures thereof; and
(3) a hydrophilic fiber selected from the group consisting of viscose, cotton, wool, cellulose, silk, a hemp fiber and mixtures thereof.

29. A wheel assembly comprising a tire having a tire-thixotropic balancing composition as defined in claim 11 deposited on the inner surface of the tire.

30. A wheel assembly comprising a tire having a tire-thixotropic balancing composition as defined in claim 19 deposited on the inner surface of the tire.

* * * * *